United States Patent
Renou et al.

(10) Patent No.: US 9,669,348 B2
(45) Date of Patent: Jun. 6, 2017

(54) PSA PROCESS WITH ONE ACTIVE STEP PER PHASE TIME

(71) Applicant: L'Air Liquide, Societe Anonyme pour l'Etude et l'Exploitation des Procedes Georges Claude, Paris (FR)

(72) Inventors: Elise Renou, Paris (FR); Christian Monereau, Montpellier (FR); Celine Carriere, Villemomble (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 27 days.

(21) Appl. No.: 14/551,276

(22) Filed: Nov. 24, 2014

(65) Prior Publication Data

US 2015/0143993 A1 May 28, 2015

(30) Foreign Application Priority Data

Nov. 28, 2013 (FR) .................... 13 61731

(51) Int. Cl.
*B01D 53/047* (2006.01)

(52) U.S. Cl.
CPC ........ *B01D 53/047* (2013.01); *B01D 2253/34* (2013.01); *B01D 2256/16* (2013.01); *B01D 2256/22* (2013.01); *B01D 2257/102* (2013.01); *B01D 2257/108* (2013.01); *B01D 2257/502* (2013.01); *B01D 2257/504* (2013.01); *B01D 2257/7025* (2013.01); *B01D 2259/4061* (2013.01); *B01D 2259/4063* (2013.01); *B01D 2259/40064* (2013.01); *B01D 2259/40067* (2013.01); *B01D 2259/4067* (2013.01); *B01D 2259/4068* (2013.01); *Y02C 20/20* (2013.01)

(58) Field of Classification Search
CPC ............. B01D 53/047; B01D 2253/34; B01D 2256/16; B01D 2256/22; B01D 2257/102; B01D 2257/108; B01D 2257/502; B01D 2257/504; B01D 2257/7025; B01D 2259/4064; B01D 2259/4067; B01D 2259/4061; B01D 2259/4063; B01D 2259/4068

USPC .......................................... 95/96, 139, 148
See application file for complete search history.

(56) References Cited

U.S. PATENT DOCUMENTS

| | | | | |
|---|---|---|---|---|
| 4,475,929 A * | 10/1984 | Fuderer | ................ | B01D 53/047 95/103 |
| 4,761,167 A | 8/1988 | Nicholas et al. | | |
| 6,210,466 B1 * | 4/2001 | Whysall | ............... | B01D 53/047 95/100 |
| 6,454,838 B1 | 9/2002 | Xu et al. | | |
| 6,565,628 B2 | 5/2003 | Xu et al. | | |
| 2005/0098034 A1 * | 5/2005 | Gittleman | ............ | B01D 53/047 95/96 |
| 2009/0214407 A1 * | 8/2009 | Reyes | .................... | B01D 53/02 423/230 |
| 2012/0174777 A1 * | 7/2012 | Baksh | .................. | B01D 53/047 95/100 |

FOREIGN PATENT DOCUMENTS

| | | |
|---|---|---|
| DE | 3 526 899 | 1/1987 |
| EP | 1 486 245 | 12/2004 |
| EP | 1 023 934 | 8/2008 |

OTHER PUBLICATIONS

French Search Report and Written Opinion for FR 1 361 731, mailed Jul. 22, 2014.

* cited by examiner

*Primary Examiner* — Frank Lawrence
(74) *Attorney, Agent, or Firm* — Elwood L. Haynes

(57) ABSTRACT

Pressure shift adsorption (PSA) process for producing a gas stream enriched with compound X from a feed gas stream, using N adsorbers with N≥5, each adsorber being subjected to a pressure cycle having a phase time corresponding to the duration of the pressure cycle divided by the number of adsorbers, and a series of active steps, characterized in that each adsorber n follows the pressure cycle with an offset of one phase time with respect to the pressure cycle of the adsorber n−1 with n≤N, and during each phase time, only one active step or a part of active step takes place.

12 Claims, No Drawings

PSA PROCESS WITH ONE ACTIVE STEP PER PHASE TIME

CROSS-REFERENCE TO RELATED APPLICATIONS

This application claims the benefit of priority under 35 U.S.C. §119 (a) and (b) to French patent application No. 1361731, filed Nov. 28, 2013, the entire contents of which are incorporated herein by reference.

BACKGROUND

Field of the Invention

The present invention relates to a process for treating a gas by adsorption, of the type in which a pressure swing adsorption treatment unit, commonly known as a PSA unit, is used, and more particularly PSA units using at least 5 adsorbers.

Related Art

Generally, a gas-phase adsorption process makes it possible to separate one or more molecules of a gas mixture containing them, by exploiting the difference in affinity of one or more adsorbents for the various constituent molecules of the mixture. The affinity of an adsorbent for a molecule depends, on the one hand, on the structure and the composition of the adsorbent and, on the other hand, on the properties of the molecule, in particular its size, its electronic structure and its multipole moments. An adsorbent may be, for example, a zeolite, an activated carbon, an activated alumina which is optionally doped, a silica gel, a carbon-based molecular sieve, a metalloorganic structure, an alkali metal or alkaline-earth metal oxide or hydroxide, or a porous structure preferably containing a substance capable of reacting reversibly with the molecules, a substance such as amines, physical solvents, metallic complexing agents, metal oxides or hydroxides, for example.

The most conventional adsorbent materials are in the form of particles (beads, rods, crushed materials, etc.) but also exists in structured form, such as monoliths, wheels, parallel-passage contactors, fabrics, fibres, etc.

Three major adsorption process families can be distinguished: lost-charge processes, temperature swing adsorption processes known as TSA and, finally, PSA (Pressure Swing Adsorption) processes.

In lost-charge processes—reference is often made in this case to a guard bed—a new charge is put in place when the one being used is saturated with the impurities or more generally when it can no longer sufficiently perform its protective role.

In TSA processes, the adsorbent at the end of use is regenerated in situ, i.e. the impurities that have been stopped are discharged so that said adsorbent recovers most of its adsorption capacities and can recommence a purification cycle, the essential regeneration effect being due to an increase in temperature.

Finally, in PSA processes, the adsorbent at the end of the production phase is regenerated by desorption of impurities, obtained by means of a decrease in their partial pressure. This decrease in pressure can be obtained by means of a decrease in the total pressure and/or by sweeping with a gas which is free of impurities or which contains few impurities.

SUMMARY OF THE INVENTION

The focus herein is on the latter type of PSA process.

Pressure swing adsorption processes are used both for eliminating traces of impurities—for example having a content of less than 1% in the feed gas—and for separating mixtures containing tens of % of various gases. In the first case, it is generally a question of purification (for example gas drying), and separation in the second case (for example, production of oxygen or nitrogen from atmospheric air). In the most complex cases, there may of course be purification and separation in one and the same unit.

DETAILED DESCRIPTION OF THE INVENTION

In the context of the present invention, the term "PSA" denotes any gas purification or separation process using a cyclic variation in pressure experienced by the adsorbent between a high pressure, termed adsorption pressure, and a low pressure, termed regeneration pressure. Thus, this generic name PSA is used without distinction to denote the following cyclic processes, to which it is also common to give more specific names depending on the pressure levels used or on the time required for an adsorber to return to its initial point (cycle time):

VSA processes in which the adsorption is carried out substantially at atmospheric pressure, preferentially between 0.95 and 1.25 bar abs, and the desorption pressure is less than atmospheric pressure, typically from 50 to 400 mbar abs;

MPSA or VPSA processes in which the adsorption is carried out at a high pressure greater than atmospheric pressure, typically between 1.5 and 6 bar abs, and the desorption at a low pressure less than atmospheric pressure, generally between 200 and 600 mbar abs;

PSA processes per se, in which the high pressure is substantially greater than atmospheric pressure, typically between 3 and 50 bar abs and the low pressure is substantially greater than or equal to atmospheric pressure, generally between 1 and 9 bar abs;

RPSA (rapid PSA) processes for which the pressure cycle duration is typically less than one minute;

URPSA (ultra rapid PSA) processes for which the pressure cycle duration is of the order of a few seconds at most.

It should be noted that these various names are not standardized and that the limits are subject to variation. It is recalled that, unless otherwise advised, the use of the term "PSA" covers herein all these variants.

It may also be noted that the gas fraction exploited in a PSA process can correspond to the fraction produced at the high pressure, but also to the fraction extracted at low pressure as long as the constituent(s) sought is (are) the most adsorbable of the mixture.

An adsorber will therefore begin an adsorption period until it is loaded with the constituent(s) to be stopped at the high pressure, then will be regenerated by depressurization and extraction of the adsorbed compounds before being restored in order to recommence a new adsorption period. The adsorber has then performed a "pressure cycle" and the very principle of the PSA process is to link these cycles together one after the other; it is therefore a cyclic process. The time taken by an adsorber to return to its initial state is called the cycle time. On principle, each adsorber follows the same cycle with an offset in time which is called phase time or more simply phase.

The following relationship therefore exists:

Phase time=cycle time/number of adsorbers and it is seen that the number of phases is equal to the number of adsorbers. This cycle therefore generally comprises periods among:

Production or Adsorption during which the feed gas is introduced via one of the ends of the adsorber, the most adsorbable compounds are preferentially adsorbed and the gas enriched with the least adsorbable compounds (product gas) is extracted via the second end. The adsorption can be carried out at increasing pressure, at substantially constant pressure, or even at slightly decreasing pressure.

Depressurization during which a part of the compounds contained in the adsorbent and the free volumes is discharged from the adsorber which is no longer fed with feed gas, via at least one of its ends. Taking the direction of circulation of the fluid in the adsorption period as reference, depressurizations can be defined as cocurrent, countercurrent or simultaneously co- and countercurrent.

Elution or Purge during which a gas enriched with the least adsorbable constituents (purge gas) circulates through the adsorbent bed in order to assist with the desorption of the most adsorbable compounds. The purge is generally carried out in countercurrent mode.

Repressurization during which the adsorber is at least partially repressurized before recommencing an Adsorption period. The repressurization can be carried out in countercurrent mode and/or in cocurrent mode.

Dead time during which the adsorber remains in the same state. These dead times can be an integral part of the cycle, enabling the synchronization of steps between adsorbers, or be part of a step which finished before the assigned time. The valves can be closed or can remain as they are depending on the characteristics of the cycle.

The term "active steps" will subsequently be used to denote the steps during which the state of the adsorber is modified, as opposed to the dead times.

When the product exploited consists of the most adsorbable constituents, it is possible to add a "Rinse" step which consists in circulating, in cocurrent mode in the adsorber, a gas enriched with the most adsorbable constituents with the objective of driving off the least adsorbable compounds from the adsorbent and the dead volumes. This Rinse step can be carried out at any pressure between the high pressure and the low pressure and generally uses a fraction of the low-pressure product after compression. The gas extracted from the adsorber can have many uses (secondary production of gas enriched with the least adsorbable constituents, repressurization, elution, fuel gas network, etc.).

Depressurization and Repressurization can be carried out in various ways, especially when the PSA unit comprises a plurality of adsorbers (or of storages). This thus leads to elementary steps being defined in order to describe more exactly the gas transfers which occur between adsorbers (or storages) and with the external environment (feed, product gas, low-pressure gas circuits). Thus, the gas discharged during the depressurization period can:

be used to repressurize one or more adsorbers which are then at lower pressure; the term Equalization Down (Ed) is then used;

be used as elution gas (purge gas) to assist with desorbing the most adsorbable constituents from a low-pressure adsorber; the term Purge Providing (PP) is then used;

be discharged to the low-pressure network; the term Blowdown (BD) is then used.

In the same way, the gas that an adsorber receives during its Repressurization can originate:

partially from the purge gas when said purge is carried out at increasing pressure. In this case, the term Elution step or Purge (P) step continues to be used, while optionally specifying at increased pressure (Pup);

from other adsorbers performing Equalizations Down (Ed). The term Equalizations Up (Eup) is then used;

from the Product gas: Rep Pr from the Feed gas: Rep F.

The role of the equalizations should be specified here. They make it possible to recover a part of the least adsorbable compounds which are in the dead volumes (intergranular space for a bed of particulate adsorbents, channels for the structured adsorbents, ends of the adsorber, etc.) or which are (weakly) adsorbed. Since these constituents are no longer lost, this makes it possible to increase the Extraction Yield of the weakly adsorbable gases, which is defined as the fraction that is recovered in Production relative to their amount in the feed gas.

Since at least a part of the Equalizations Down are carried out in cocurrent mode in order to be efficient, the most adsorbed compounds have a tendency to progress toward the outlet end. Since it is desired to maintain them in the adsorber, this leads to an additional volume of adsorbent being provided. The increase in yield associated with the equalizations results in larger adsorbers. The required volume of the adsorbers in order to obtain a product at the required purity is defined via the Productivity. The Productivity can be expressed simply in $Nm^3$ of feed gas treated per $m^3$ of adsorbent. Other definitions call upon the actual or standardized adsorption time or on the $Nm^3$ of product gas, or even integrate the adsorption pressure. Unless otherwise advised, we will limit ourselves to the first definition. The performance criteria represented by the yield and the productivity are intimately linked and usually evolve in opposite directions. Thus, during the design of a PSA unit, the choice of a high yield generally leads to a low productivity and vice versa.

As long as there is a plurality N of adsorbers, multiple equalizations can be envisioned, the adsorber in depressurization successively providing gas to various adsorbers at lower initial pressure. An equalization can be complete if, at the end of the substep, the pressures of the 2 adsorbers are identical (to within, for example, about ten millibar) or partial (incomplete) if the gas exchange is interrupted before the end, leaving a noticeable pressure difference between the 2 adsorbers, for example if the variation in pressure in the adsorbers during this substep is less than or equal to 95% of what it would have been in the case of complete equalization. It is then possible to indicate the difference in pressure between the two adsorbers at the end of the step, for example DP2=1 bar to signify that, at the end of the second equalization, there is a difference of 1 bar between adsorbers.

In order to explain more clearly the principle of the invention, the case of $H_2$ PSAs will now be taken, $H_2$ PSA being the PSA process which has probably experienced the most developments over the past few years owing to its success among various hydrogen-consuming industries.

This is intended to mean hydrogen at a purity greater than 95 mol %, generally greater than 98 mol % and which can, when the consuming process requires it, reach purities greater than 99.99%.

Numerous improvements have already been introduced into these units, whether in terms of ease of exploitation, of reliability or of performance levels. Thus, as regards performance levels, namely improvement of yield or decrease in expenditure, various approaches have been carried out, in particular:

addition of equipment for regenerating the adsorbent at lower pressure, such as a vacuum pump or an ejector, or for carrying out recycling of a part of the gas, for instance the addition of a compressor for recycling a part of the residual gas.

Choice of adsorbents which are more efficient, more numerous and as a result better suited to the evolution of the compositions actually within the adsorber, used in the form of successive multiple beds.

Use of a plurality of adsorbers enabling more effective cycles by addition of new steps, by different arrangement of the steps, by shortening of the cycle time. The multiple equalizations to which reference has already been made are part of the means already used to improve the hydrogen extraction yield.

A certain number of documents can illustrate the modifications introduced into $H_2$ PSA cycles.

Document EP 1 486 245 describes $H_2$ PSA cycles with 3 or 4 equalizations for which only the detail of the arrangement of the substeps differs from one cycle to the other. It can be noted that the majority of the phases of these cycles contain several steps. For example, on the cycle disclosed in claim 1, 7 of the 10 phases correspond at least to 2 active steps: equalizations 1 and 2/equalization 3 and equalization 4 simultaneously with feed-purge/feed-purge and blowdown/blowdown and elution/elution and equalization 4/equalizations 3 and 2/equalization 1 and final repressurization.

Moreover, document U.S. Pat. No. 6,454,838 describes $H_2$ PSAs with 6 adsorbers and 4 equalizations, the cycle of which is described schematically in Table 1 below.

TABLE 1

| A | A | A | A |
|---|---|---|---|
| Eq1 | Eq2 | I | Eq3 |
| PP | PP | BD + Eq4 | BD |
| P(pp) | P(pp) | E'q4 | E'q3 |
| I | E'q2 | I | I |
| E'q1 | R(f/p) | R(f/p) | R(f/p) |

As is seen, the elution gas (PP) is extracted from the adsorber between the equalization Eq3 and a substep during which there is simultaneously cocurrent depressurization in order to perform a fourth equalization and countercurrent depressurization in order to begin the final blowdown. In order for it to be possible for this cycle to be carried out without the use of intermediate gas storage capacity, said cycle comprises several dead times I. It can be noted that, in the second phase, there are 3 equalization steps and a dead time.

Document U.S. Pat. No. 6,565,628 teaches cycles with 12, 14 or 16 adsorbers having 4 or 5 equalizations, including optionally a substep with simultaneously provision of elution gas and the beginning of final countercurrent blowdown. The cycle described also comprises short equalization times. Two phases contain 3 distinct active steps (feed-purge, equalization 4 and blowdown, or else elution, equalizations 4 and 3).

In addition, document EP 1 023 934 describes an $H_2$ PSA cycle with only 3 adsorbers and 1 equalization comprising 4 active steps in the second phase: equalization, feed-purge, blowdown and elution. To do this, the elution gas is temporarily stored in a storage so as to be used with an offset in time. It is perceived that the stacking up of these 4 step times will determine the minimum phase time and thereby, by multiplying by 3 (3 adsorbers), the cycle time.

The examples could be multiplied, but it is clear that the current trend in the development of the cycles corresponds to the implementation of a plurality of substeps during a phase time so as to make it possible to carry out the shortest possible cycles with the fewest possible adsorbers. This is all the more true if large amounts of hydrogen are produced and if it is desired to have both high extraction yields and the lowest possible expenditures, which normally do not go together.

However, this process has its limits, some of which already appear in the examples cited. The minimum duration of a step can come from the physics relating to the adsorption itself, for example the kinetics which mean that a certain amount of time is necessary to reach equalization between gas phase and adsorbed phase and to thus fully take advantage of the adsorption capacities of the adsorbents used, but also more mundanely from the time required to manoeuvre the valves or from the maximum speeds of the gases through the beds of adsorbents (attrition, placing in motion, etc.). It may thus be advantageous to couple two elementary steps in just one step, for instance equalization 4 and feed-purge, which makes it possible to obtain a lower average flow rate (document EP 1 486 245). The coupling of countercurrent Blowdown and cocurrent Equalization also makes it possible to reduce the gas flow rate to each of the ends (document U.S. Pat. No. 6,454,838). This is obviously done to the cost of greater complexity which requires more significant control and safety means. Another limitation to the multiplication of the steps in the same phase time is the fact that a majority of the steps must be synchronous between adsorbers. For example, an equalization 2 at decreasing pressure must be carried out simultaneously with an equalization 2 at increasing pressure, i.e., in practice, one adsorber must be ready to receive the gas provided by another. If the equalization 2 is in the middle of a phase for one, it must also be in the middle of the phase for the other. This can involve dead times, as in Example 2, or the use of storage capacities to create offsets in time, as in document EP 1 023 934.

Finally, as the steps are shortened, in particular the equalizations, it becomes difficult to achieve the optimum equalization point at the end of the step, i.e. the same pressure in the two adsorbers in the case of these equalizations, and it is common practice to sacrifice a little performance level (in this case yield) in order to limit the valve size. Incomplete equalizations are then carried out, as previously mentioned.

Starting from that point, a problem which arises is that of providing a PSA process which exhibits good performance levels and a reduced expenditure.

One solution of the invention is a pressure swing adsorption (PSA) process for producing a gas stream enriched with compound X from a feed gas stream, using N adsorbers with N≥5, each adsorber being subjected to a pressure cycle having:

a phase time corresponding to the duration of the pressure cycle divided by the number of adsorbers, and a series of active steps;

characterized in that:

each adsorber n follows the pressure cycle with an offset of one phase time with respect to the pressure cycle of the adsorber n−1 with n≤N, and during each phase time, only one active step or one part of an active step takes place.

As appropriate, the process according to the invention may have one or more of the following characteristics:

N≥7;

the steps are part of the group: adsorption, equalization at decreasing pressure (equalization down), feed-purge, countercurrent blowdown, purge, equalization at increasing pressure (equalization up), recompression by means of the feed gas stream or of the gas stream enriched with compound X and coupling of these steps;

at least one step takes place over more than one phase;

the adsorbers used have a diameter of between 0.1 m and 6 m, preferably between 0.1 m and 3 m;

the adsorbers have a height of between 1 m and 10 m;

the phase time is greater than or equal to 10 seconds;

the pressure cycle is carried out over a period of greater than 1 minute, preferably greater than 2 minutes;

the compound X is hydrogen or $CO_2$;

the adsorbers comprise particulate adsorbents;

the adsorbers comprise structured adsorbents;

the pressure cycle is controlled by a set of valves and/or of distributers.

The term "distributor" is intended to mean systems which make it possible, depending on their position, to connect or block a plurality of circuits;

the feed gas stream has a flow rate of greater than 100 000 $Nm^3/h$.

In other words, unlike the current trend, the invention consists in that each elementary step lasts for a whole phase or a whole number of phases or, expressed differently, each of the phases constituting the cycle corresponds to just one elementary step or to just one substep if said step takes place over several phase times.

This invention relates, a priori, only to the case of relatively elaborate

PSAs, the pressure cycles of which comprise at least 5 distinct elementary steps and preferentially at least 7, with the aim of obtaining higher performance levels than in the most basic cycles, such as, for example, a cycle which would comprise only Adsorption/countercurrent Blowdown/elution/repressurization. For cycles of this type, a conventional solution with 2 or preferentially 3 adsorbers (Adsorption/Blowdown/elution+Repressurization) will generally be better.

The invention will presently be described in greater detail using an example. The basis is the cycle used in document EP 1 023 934 corresponding to Table 2 below:

TABLE 2

| Ads | Ads | Ads | Ads |
| --- | --- | --- | --- |
| Ed1 | PP | BD | P |
| Eup1 | Rep | Rep | Rep |

When the first adsorber is in production over the whole of a phase, the second which has finished this adsorption phase will successively provide equalization gas, then elution gas, will undergo countercurrent blowdown to the low pressure of the cycle (BD) and then will be purged (P); it is recalled that this is possible through the existence of a temporary storage capacity for the elution gas. The third adsorber is first repressurized via the equalization Eup1 and then by production gas (or optionally by feed gas).

This cycle requires only 3 adsorbers, but its phase time will be imposed by the second phase. It will be difficult to descend below 120 seconds (for example, 20 seconds for each of the first three steps and 60 s for the elution step).

This duration therefore imposes an adsorption time of 120 seconds and a repressurization step of 100 seconds completing the equalization Eup1 of necessarily 20 seconds.

The size of the adsorber will therefore correspond to the purification of 100% of the feed flow rate for 120 seconds.

The cycle according to the invention may correspond to one of the 2 cycles proposed below:

TABLE 3

| Ads | Ads | Ed1 | PP | BD | P | P | Eup1 | Rep |
| --- | --- | --- | --- | --- | --- | --- | --- | --- |

Or

TABLE 4

| Ads | Ads | Ads | Ed1 | PP | BD | P | P | P | Eup1 | Rep |
| --- | --- | --- | --- | --- | --- | --- | --- | --- | --- | --- |

In any event, it is desired to maintain an adsorption and elution period of at least 60 seconds.

This result can be achieved by using 9 adsorbers and a phase time of 30 seconds (Table 3) or 11 adsorbers with a phase time of 20 seconds (Table 4).

It appears to be paradoxical to want to use 3 to 4 times more adsorbers for a result which is equivalent a priori in terms of yield.

In fact, in the case of Table 3, each adsorber treats 50% of the feed gas flow rate for 2 times 30 seconds: the adsorber is 4 times smaller than the initial adsorber. The overall volume of adsorbent in the unit represents only ¾ of the volume of adsorbent of the starting unit.

In the case of the cycle of Table 4, each adsorber treats ⅓ of the total flow rate for 3 times 20 seconds: the adsorber is 6 times smaller than the basic adsorber and the total volume of adsorbent now represents only approximately 60% of the initial volume.

There is therefore a noticeable gain regarding the cost of the adsorbent.

With regard to the adsorbers themselves, since the cost is not entirely proportional to the size, the gain corresponding to using more adsorbers of smaller volume may be less. However, it should be noted that, when very large hydrogen flow rates are produced, for example more than 100 000 $Nm^3/h$, as is presently the case in refining and petrochemistry, the volume of the adsorbers, even with the most effective multibed cycles, is several tens of $m^3$ and that this size even poses problems: the thickness of the shell, the dimensions of the bottoms, etc., limit the sources of supply, especially since the transport becomes increasingly difficult. With regard to these points, it has been suggested to replace a large adsorber with a plurality of smaller adsorbers operating in parallel. This also amounts to multiplying the number of adsorbers of the PSA unit, but without reducing the total volume.

The latter solution makes it possible to retain a low number of large valves (a group of adsorbers operating in parallel being able to retain the set of valves of the adsorber replaced), but the problem of large sizes also relates to the valves. It is a problem both in terms of economics and in terms of mechanics. In order to perform short steps, the valve manoeuvring time must be very rapid in order to limit the dead times. The mechanization required, the mechanical strength, and the control means which have had to be adjusted to this operation mean that the cost of these valves can be more than proportional to their size. Here again, it has been proposed to replace a 100% valve with two 50% valves. This thus leads to the number of valves used being multiplied for reasons of cost of this material, but without taking advantage of this for the cycle of the PSA.

The present invention also answers this valve problem. It was seen in the examples above that each adsorber in adsorption phase treated, as appropriate, ½ or ⅓ of the feed flow rate. Each adsorber will likewise produce 1½ or ⅓ of the hydrogen production: those valves (feed, production valves) will therefore be reduced in the same proportions.

More surprisingly, the same is true for the other valves constituting the "skid valves" of an adsorber. Indeed, the size of the equalization, feed-purge and countercurrent blowdown valves depends on the amount of gas to be transferred and on the time Tv allowed for this transfer. The amount of gas to be transferred—between 2 fixed pressures—itself depends on the volume V of the adsorber. The criterion V/Tv is representative of the size of these valves.

Let us compare our $2^{nd}$ example (Table 4) to the basic case. Since the durations of the steps which have just been mentioned are identical between the 2 PSAs, the flow rate to be passed through the valves of the PSA according to the invention is now only ⅙ of the corresponding flow rate of the basic case.

It can also be noted, from the expenditure point of view, that the elution gas storage capacity has been eliminated and, from a performance level point of view, that the production is perfectly stable in the case according to the invention since the flow rate for the final repressurization is taken from a complete phase and therefore continuously over time, which was not the case previously.

In addition to the easier transportation of smaller equipment, the setting up on the site can, if necessary, be adapted to the place available by arranging the plurality of adsorbers in various ways (in a line, in an L-shape, in rows, in a U-shape, etc.).

It is presently advisable to define more precisely the elementary active steps of the PSA of which the duration according to the invention is one complete phase or a whole number of phases.

A step can be defined as the time period during which the path of the fluids remains unchanged, which also corresponds to a given open position (100% open, x % open, open in regulation, etc.) or closed position for each of the skid valves.

The most conventional independent active steps will therefore be: Adsorption, equalization down 1, equalization down 2, . . . equalization down i, feed-purge, countercurrent blowdown, purge, equalization up i, . . . equalization up 2, equalization up 1, final repressurization (by the stream enriched with compound X and/or by the feed stream). The letter "i" means that the equalization number is not limited.

It will be noted that an equalization may be total or incomplete. In order to leave, for example, 1 bar of pressure difference between adsorbers, it may be necessary to close the valves which allow the two adsorbers to communicate before the end of the ongoing phase, thus creating a dead time. The existence of this dead time does not change the philosophy of the invention and there continues to be a single active step during said phase.

TABLE 5

| Ed2 | Ed3 (DP + 1)/I | PP |
| --- | --- | --- |

Thus, the above sequence of Table 5 in which the equalization 3 is interrupted although there remains a 1 bar pressure difference between adsorbers and in which the phase time in question is extended by a dead time falls within the context of the invention.

The equalizations are generally carried out by cocurrent circulation in the adsorber undergoing depressurization and countercurrent circulation in the adsorber undergoing repressurization, i.e. which receives the gas. It is thus possible to simultaneously have an equalization "via the top and via the bottom" constituting a step.

There may be other steps with two simultaneous actions, for instance: equalization and feed-purge, feed-purge and countercurrent depressurization, equalization up and final repressurization, etc.

If the two actions are simultaneous from one end to the other, this constitutes a single step within the meaning of the invention. On the other hand, if, for example in the first example, the feed-purge is interrupted while the equalization continues, it must be considered that the cycle comprises two distinct steps at this level: an equalization and feed-purge followed by an equalization step.

Likewise, if an equalization/feed-purge step is followed by a step during which there is only provision of purge gas, there are two distinct steps within the meaning of the invention.

By way of illustration, it is possible to go back to the cycle of Table 6.

TABLE 6

| A | A | A | A |
| --- | --- | --- | --- |
| Eq1 | Eq2 | I | Eq3 |
| PP | PP | BD + Eq4 | BD |
| P(pp) | P(pp) | E'q4 | E'q3 |
| I | E'q2 | I | I |
| E'q1 | R(f/p) | R(f/p) | R(f/p) |

This cycle corresponds to 6 adsorbers with 6 phase times, each of the phases corresponding to a row of the table.

The unit according to the invention would comprise, for example 15 adsorbers following the cycle below with an offset of one phase time between adsorbers.

TABLE 7

| Ads | Ads | Ed1 | Ed2 | Ed 3 | PP | BD + Ed4 | BD | P | P | Eup4 | Eup3 | Eup2 | Eup1 | Rep |
| --- | --- | --- | --- | --- | --- | --- | --- | --- | --- | --- | --- | --- | --- | --- |

Another advantage of the cycles according to the invention is seen to emerge. Having a single elementary step per phase results in there automatically being a synchronization of the steps which go in pairs, for instance the corresponding equalizations down and up. There is no need to provide for a dead time in order to make steps of this type correspond, as is the case with the cycle of Table 6 (see second and fifth phases).

A hydrogen PSA cycle has thus far been described since it is one of the applications that are a priori the most advantageous given the development of the market. The invention in terms of its actual principle can apply, a priori, to all PSA cycles in the most general sense.

Thus, it is possible to envision, for example, a PSA unit intended to strip the $CO_2$ from an oxygen blast furnace gas in order to recycle it while producing $CO_2$ at a purity sufficient to sequester it.

A possible cycle corresponds to the following table:

TABLE 8

| Ads | Ads |
|---|---|
| Ed1 | Ed2 |
| Rinse (+PP) | BD |
| BD (V) | BD(V) |
| P | Eup2 |
| Eup1 | Rep |

The Rinse step consists in circulating in cocurrent mode, in the bed of adsorbent, a fraction of the $CO_2$ production at the pressure of the end of the $2^{nd}$ equalization in order to drive the ligher constituents (CO, $CH_4$, $H_2$, $N_2$) from the adsorbent inlet zone so as to subsequently recover, during the Blowdown (countercurrent depressurization) an effluent highly enriched with $CO_2$. It will be noted that the $CO_2$ is also extracted from the adsorber during the following phase with the (optional) aid of a vacuum pump.

The gas recovered at the outlet during the Rinse step is used during a purge step P to push the $CO_2$ back towards the inlet end of the adsorber. The gas recovered at the purge outlet is discharged to the exterior of the unit or recycled in the feed gas.

The cycle is constructed in order to adhere to the time couplings Ed1/Eup1, Ed2/Eup2, Rinse (+PP)/P and to ensure continuous pumping, i.e. passing from one adsorber to the next.

According to the principle of the invention, a unit with 10 adsorbers will a priori be used:

TABLE 9

| Ads | Ed1 | Ed2 | Rinse | BD | BD(V) | P | Eup2 | Eup1 | Rep |
|---|---|---|---|---|---|---|---|---|---|

The adsorbers could be half the size with the same vacuum pump however (half as much gas to pump in half as much time).

The basic applications envisaged for PSAs according to the invention are preferentially processing units of high flow rate, for example more than 100 000 $Nm^3/h$, with conventional adsorbents and usual valves. The phases will preferably have a duration equal to 10 seconds and more, resulting in cycles having a duration of more than one minute and preferentially of at least 2 minutes.

Nevertheless, the cycles according to the invention are also very suitable for the new adsorbent structures in the process of being developed.

The term "new structures" is intended to mean structured adsorbents. The adsorbent is no longer in the form of millimetric particles (beads, rods, crushed materials, pellets, etc.) but has more complex geometries and sizes of several centimetres or even of several tens of centimetres. This may involve monoliths, parallel-passage contactors, sets of fibres in parallel, adsorbent fabric, etc.

The point that it is desired to emphasize here is that it is today at least difficult to prepare structured adsorbents compatible with PSAs of large size. Rather than placing in parallel, in an adsorber, several modules of maximum producible size (cross section), it may be advantageous to use the process according to the invention and to use several phases (therefore several adsorbers) to perform the steps of the cycle.

Cycles of the following type comprising 22 (or more) phases could then be carried out:

TABLE 10

| 1 | 2 | 3 | 4 | 5 | 6 | 7 | 8 | 9 | 10 | 11 |
|---|---|---|---|---|---|---|---|---|---|---|
| Ads | Ads | Ads | Ads | Ads | Ed1 | Ed2 | Ed3 | Ed 3 | PP | PP |
| 12 | 13 | 14 | 15 | 16 | 17 | 18 | 19 | 20 | 21 | 22 |
| BD | BD | P | P | P | P | Eup3 | Eup3 | Eup2 | Eup1 | Rep |

Since the phase time with this new type of adsorbent can be of the order of a second or a few seconds, it has been assumed here that the adsorption takes place over a period of 5 phases, the equalization 3 (at the lowest pressure of the equalizations) that it was desired to be complete over the course of 2 phases, the feed-purge and the countercurrent blowdown over the course of 2 phases each and, finally, the elution over the course of 4 phases.

Generally, such cycles also make it possible to very easily carry out substitution cycles in the event of a problem on an adsorber. Taking the example of the cycle of Table 10, it is possible to eliminate an adsorption phase and to continue to produce 80% of the production, but it would also be possible to continue to treat 100% of the feed gas while keeping just one of the two substeps of the equalization 3. About one point would be lost in terms of extraction yield. It would also be possible to shorten the elution step by making it last for only three phases. This type of cycle allows a great deal of flexibility in terms of use with "degraded" working (with at least one adsorber withdrawn from the cycle).

Likewise, with a cycle according to the invention, it is relatively easy to make a change thereto by adding further adsorbers and therefore phases. It is thus possible, for example, to increase the flow rate treated and the production by adding a further adsorption phase or to increase the yield by adding a further equalization down phase and the corresponding equalization up phase. The smaller size of the adsorbers optionally allows further additions of adsorbers that are impossible in the standard case.

If, generally, the fluid transfers are controlled via valves, it is possible, in particular for units of URPSA type to which reference has just been made, to use distributers, i.e. systems which make it possible, depending on their position, to connect or block a plurality of circuits. A single distributor of this type, which is a piston distributor or optionally a rotary distributor, makes it possible to replace several standard valves.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense, For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing Le. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A pressure swing adsorption process for producing a gas stream enriched with compound X from a feed gas stream, using N adsorbers with N≥7, each adsorber being subjected to a pressure cycle having:
    a phase time corresponding to the duration of the pressure cycle divided by the number of adsorbers, and
    a series of active steps, including at least one equalization step, characterized in that:
    each adsorber n follows the pressure cycle with an offset of one phase time with respect to the pressure cycle of the adsorber n−1 with n≤N, and
    during each phase time, only one active step or a part of an active step takes place.

2. The process according to claim 1, wherein the active steps are part of the group: adsorption, equalization at descending pressure, feed-purge, countercurrent blowdown, purge, equalization at increasing pressure, recompression by means of the feed gas stream or of the gas stream enriched with compound X and a coupling of these steps.

3. The process according to claim 1, wherein the adsorbers used have a diameter of between 0.1 m and 6 m.

4. The process according to claim 1, wherein the adsorbers have a height of between 1 m and 10 m.

5. The process according to claim 1, wherein at least one step takes place over more than one phase.

6. The process according to claim 1, wherein the phase time is greater than or equal to 10 seconds.

7. The process according to claim 1, wherein the pressure cycle is carried out over a period of greater than 1 minute.

8. The process according to claim 1, wherein the compound X is hydrogen or $CO_2$.

9. The process according to claim 1, wherein the adsorbers comprise particulate adsorbents.

10. The process according to claim 1, wherein the adsorbers comprise structured adsorbents.

11. The process according to claim 1, wherein the pressure cycle is controlled by a set of valves and/or of distributors.

12. The process according to claim 1, wherein the feed gas stream has a flow rate of greater than 100 000 $Nm^3/h$.

* * * * *